United States Patent
Stokking et al.

(10) Patent No.: US 10,135,668 B2
(45) Date of Patent: Nov. 20, 2018

(54) METHOD, DEVICE, SYSTEM AND NETWORK ARCHITECTURE FOR HANDLING A SERVICE REQUEST

(75) Inventors: Hans Maarten Stokking, Wateringen (NL); Eelco Cramer, Amsterdam (NL); Frank den Hartog, Voorschoten (NL)

(73) Assignees: Koninklijke KPN N.V., Rotterdam (NL); Nederlandse Organisatie voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 264 days.

(21) Appl. No.: 13/996,189

(22) PCT Filed: Dec. 22, 2011

(86) PCT No.: PCT/EP2011/073819
§ 371 (c)(1),
(2), (4) Date: Jun. 20, 2013

(87) PCT Pub. No.: WO2012/085220
PCT Pub. Date: Jun. 28, 2012

(65) Prior Publication Data
US 2013/0275540 A1    Oct. 17, 2013

(30) Foreign Application Priority Data
Dec. 23, 2010    (EP) .................................... 10196719

(51) Int. Cl.
*G06F 15/16*    (2006.01)
*H04L 29/12*    (2006.01)
(Continued)

(52) U.S. Cl.
CPC .... *H04L 29/12254* (2013.01); *H04L 12/2809* (2013.01); *H04L 12/2814* (2013.01);
(Continued)

(58) Field of Classification Search
CPC .......... H04L 67/16; H04L 67/18; H04L 67/20
(Continued)

(56) References Cited

U.S. PATENT DOCUMENTS 5,991,306 A * 11/1999 Burns ............... G06F 17/30902
  370/429
6,711,157 B1 * 3/2004 Tang ................. G06F 17/30867
  370/352
(Continued)

FOREIGN PATENT DOCUMENTS

CN    101673298 A    3/2010
EP    1628212 A2    2/2006
(Continued)

OTHER PUBLICATIONS

PCT International Search Report and Written Opinion, PCT International Application No. PCT/EP2011/073819 dated Apr. 5, 2012.
(Continued)

*Primary Examiner* — Madhu Woolcock
(74) *Attorney, Agent, or Firm* — McDonnell Boehnen Hulbert & Berghoff LLP

(57) ABSTRACT

The present invention relates to a method for handling a service request within a local area network. First a service request is received from a user device. The service request comprising information regarding one or more requirements needed to perform the service. Then a download location is localized by means of a localization service within a public network to obtain computer executable information on the basis of the information in the service request. The computer executable information is then retrieved for performing the service from the download location and installed on a networked device within the local area network. Finally, a message is sent to the user device regarding the availability of the service within the local area network.

17 Claims, 2 Drawing Sheets

(51) Int. Cl.
*H04L 12/28* (2006.01)
*H04L 29/08* (2006.01)

(52) U.S. Cl.
CPC .......... *H04L 12/2856* (2013.01); *H04L 67/16* (2013.01); *H04L 67/2814* (2013.01); *H04L 67/34* (2013.01); *H04L 61/1511* (2013.01); *H04L 67/289* (2013.01)

(58) Field of Classification Search
USPC .......................................... 709/206, 219, 249
See application file for complete search history.

(56) References Cited

U.S. PATENT DOCUMENTS

| | | | | |
|---|---|---|---|---|
| 6,983,326 | B1* | 1/2006 | Vigue et al. .................. | 709/229 |
| 7,127,526 | B1* | 10/2006 | Duncan .................. | G06F 15/16 |
| | | | | 709/249 |
| 7,289,534 | B1* | 10/2007 | Bailey ................ | H04L 41/5025 |
| | | | | 370/401 |
| 7,315,886 | B1* | 1/2008 | Meenan ................ | H04L 63/126 |
| | | | | 709/212 |
| 7,965,703 | B2* | 6/2011 | Rieger ................... | H04L 41/12 |
| | | | | 370/352 |
| 8,086,495 | B2* | 12/2011 | Ansari ............... | G06Q 30/0601 |
| | | | | 705/26.1 |
| 8,180,891 | B1* | 5/2012 | Harrison ....................... | 709/224 |
| 8,478,836 | B1* | 7/2013 | Chang et al. ................. | 709/213 |
| 8,595,186 | B1* | 11/2013 | Mandyam ................ | G06F 8/38 |
| | | | | 707/632 |
| 2001/0039565 | A1* | 11/2001 | Gupta ...................... | G06F 9/54 |
| | | | | 709/203 |
| 2002/0138589 | A1* | 9/2002 | Al-Kazily ......... | G06F 17/30902 |
| | | | | 709/217 |
| 2003/0105764 | A1* | 6/2003 | Kageyama ............. | G06Q 30/02 |
| 2003/0163680 | A1* | 8/2003 | Wang et al. ...................... | 713/1 |
| 2003/0191802 | A1* | 10/2003 | Zhao et al. .................. | 709/203 |
| 2004/0054718 | A1* | 3/2004 | Hicks, III ............. | H04L 67/125 |
| | | | | 709/203 |
| 2004/0171379 | A1* | 9/2004 | Cabrera .............. | G06F 17/3087 |
| | | | | 455/422.1 |
| 2004/0205766 | A1* | 10/2004 | Lee et al. ....................... | 719/311 |
| 2005/0021725 | A1* | 1/2005 | Lobbert ................ | H04W 48/16 |
| | | | | 709/223 |
| 2005/0102393 | A1* | 5/2005 | Murray ................... | H04L 29/06 |
| | | | | 709/224 |
| 2005/0240680 | A1 | 10/2005 | Costa-Requena et al. | |
| 2006/0031832 | A1* | 2/2006 | Kishida .................... | G06F 8/61 |
| | | | | 717/176 |
| 2006/0067249 | A1* | 3/2006 | Poustchi et al. .............. | 370/260 |
| 2007/0094364 | A1* | 4/2007 | Oberhauser ............ | G06F 9/547 |
| | | | | 709/223 |
| 2007/0143496 | A1* | 6/2007 | Golovinsky et al. ......... | 709/238 |
| 2007/0150595 | A1* | 6/2007 | Bhorania .............. | H04L 67/325 |
| | | | | 709/226 |
| 2007/0254634 | A1* | 11/2007 | Costa-Requena ..... | H04W 8/245 |
| | | | | 455/412.1 |
| 2007/0275715 | A1* | 11/2007 | Lee et al. ....................... | 455/427 |
| 2007/0280206 | A1* | 12/2007 | Messer et al. ................. | 370/352 |
| 2008/0040438 | A1* | 2/2008 | Gan ........................ | G06Q 10/04 |
| | | | | 709/206 |
| 2008/0046539 | A1 | 2/2008 | Lee et al. | |
| 2008/0120405 | A1* | 5/2008 | Son ..................... | H04L 12/2809 |
| | | | | 709/223 |
| 2008/0130639 | A1 | 6/2008 | Costa-Requena et al. | |
| 2008/0249782 | A1* | 10/2008 | Ativanichayaphong .................... | H04L 29/08072 |
| | | | | 704/275 |
| 2008/0289013 | A1* | 11/2008 | Morris .............. | G06F 17/30905 |
| | | | | 726/5 |
| 2008/0295093 | A1* | 11/2008 | Hutchings ................. | G06F 8/61 |
| | | | | 717/178 |
| 2009/0083426 | A1* | 3/2009 | Cagenius ............... | H04L 29/125 |
| | | | | 709/227 |
| 2009/0282458 | A1* | 11/2009 | Hjelm ............................... | 726/1 |
| 2010/0325199 | A1* | 12/2010 | Park ................... | G06F 17/30067 |
| | | | | 709/203 |
| 2011/0078231 | A1* | 3/2011 | Oliver .................... | G06F 9/5055 |
| | | | | 709/203 |
| 2011/0125903 | A1* | 5/2011 | Silva-Lepe ........... | G06F 9/5055 |
| | | | | 709/226 |
| 2011/0246586 | A1* | 10/2011 | Steele ..................... | H04L 12/14 |
| | | | | 709/206 |
| 2011/0286592 | A1* | 11/2011 | Nimmagadda ..... | H04M 3/5238 |
| | | | | 379/266.06 |

FOREIGN PATENT DOCUMENTS

| | | |
|---|---|---|
| EP | 1971118 A1 | 9/2008 |
| JP | 11-065968 | 3/1999 |
| JP | 2002-247668 | 8/2002 |
| JP | 2003-256311 | 9/2003 |

OTHER PUBLICATIONS

European Search Report, European Patent Application No. 10196719.8 dated Jun. 10, 2011.
English Translation of Notice of Reasons for Rejection, Japanese Patent Application 2013-545414, dated Aug. 22, 2014.
English translation of Chinese Office Action dated Apr. 6, 2016 for Chinese Application Serial No. 201180068721.0, filed Dec. 22, 2011.

* cited by examiner

METHOD, DEVICE, SYSTEM AND NETWORK ARCHITECTURE FOR HANDLING A SERVICE REQUEST

CROSS REFERENCE TO RELATED APPLICATIONS

The present application is a national stage entry of PCT/EP2011/073819, filed Dec. 22, 2011, and claims priority to EP 10196719.8, filed Dec. 23, 2010. The full disclosures of EP 10196719.8 and PCT/EP2011/073819 are incorporated herein by reference.

FIELD OF THE INVENTION

The present invention relates to a method for handling a service request within a local area network. The invention further relates to a computer readable medium for performing, when executed by a processor, such method. The invention further relates to a device for handling a service request, as well as to a system including such device. Finally, the invention relates to a network architecture for handling a service request, in which the network comprises such gateway system.

BACKGROUND OF THE INVENTION

Nowadays local area networks, such as home networks or office networks comprise a variety of devices, usually connected to the public network via a gateway, also referred to as a home gateway or residential gateway. Examples of networked devices include but are not limited to personal computers, laptops, personal digital assistants, smartphones, tables, set top boxes, media players, alarm systems, lighting systems, and home automation sensors.

The home gateway is used for connection to the outside world, but may also be used to host services for use in the local network, and function as a platform where software modules can be loaded and unloaded. An example is the use of a home gateway as an Open Service Gateway initiative (OSGi) platform, where software modules, for example Java-modules, can be installed on-the-fly without rebooting the home gateway.

The home gateway can offer services to other devices in the local area network, sometimes this will mean delivering a service in the sense that software can be downloaded. Most often the home gateway enables a connection to the outside world, i.e. a public network. The connection service provided by a home gateway may be limited to a routing service, but often includes other services as well. Examples of services that may be part of a connection service provided by a home gateway include but are not limited to a network address translation (NAT) service, a firewall service, a quality of service management service, and an access control service. In addition a home gateway often serves as a system with a specific functionality within the local network. For example, a home gateway may serve as a home telephone system, as a translation/transcoding device for media streams, as a storage facility for the local area network, and/or as a printer control unit.

Also networked devices in the local area network can offer services to other devices in the same local area network. Such services may include a media server, a media player, a printing service, a lighting service as for example a lamp remote control, a thermostat service, etc. and may also include a software download service.

The home gateway may further comprise a service registry or be communicatively connected to such service registry within the local area network. The service registry registers location and further information of a deployed device within the local area network.

A user device is a device which a person uses to access services offered by networked devices. A user device can for example be a laptop computer, a smartphone, a tablet PC, or a generic input/output device.

When a user device requires a service from a networked device, it can obtain such service by using a so-called service discovery. In this procedure, which may be performed using standardized protocols such as Universal Plug and Play (UPnP), Service Location Protocol (SLP), Jini or Universal Description Discovery and Integration (UDDI), the user device initiates the service discovery by sending a service discovery message to the registry requesting information regarding the service. In response, the registry provides the user device with the location and further information that enables the device to request the service using the information obtained from the registry.

When the required service is not deployed and/or running on any networked device within the local area network, the user device cannot find the device through service discovery. In such case, the user device, either directly or via the home gateway, may search for the service on a public network or wide area network, such as the Internet. The service, if found, is then offered remotely across the network directly to the user device.

However, this option of service discovery in combination with remote service offering across an external network is limited. A local area network often uses private interne protocol (IP) address ranges and NAT on the home gateway. Under these circumstances a service may not work properly when provided remotely, i.e. outside the local area network. Additionally, while the communication over the public network is often IP-based, communication within the local area network is quite often based on different network protocols, used for example for alarm systems or home automation. Although the home gateway may be used as a mediating and/or translation device, a remotely offered service may be misinterpreted or misunderstood. Furthermore, many local area networks are controlled with respect to quality of service, for example by the home gateway. To ensure a good quality of service, a local view of the network in terms of bandwidth availability, number and position of nodes, congestion, etc. is needed. Such local view of the local area network is generally not available to the remotely offered service. Furthermore, the user device often needs specific software and functionality, not offered by protocols such as for example UPnP, to access services not offered by the networked devices.

To avoid a situation where a service can only be offered when it is deployed and/or running on a device within a local area network, one or more services could be uploaded to a home gateway, for example in the form of a list including upload location. However, generally only one internet service provider is able to upload services, and many more service providers (not necessarily internet service providers) could be offering services that can run on user devices within the local area network. In addition, new services can appear over time. It is impossible to configure in advance any and all available services on a home gateway.

SUMMARY OF THE INVENTION

It is an object of the present invention to enable local delivery of a service when needed by a user device within a local area network independent of the present availability of such service within the local area network. For this purpose, the invention relates to a method for handling a service request within a local area network, the method comprising: receiving a service request from a user device, the service request comprising information regarding one or more requirements needed to perform the service; localizing a download location by means of a localization service within a public network to obtain computer executable information on the basis of the information in the service request; retrieving computer executable information for performing the service from the download location and arranging installment of the computer executable information on a networked device within the local area network; and sending a message to the user device regarding the availability of the service within the local area network.

Some embodiments of the invention relate to a computer readable medium for performing, when executed by a processor, the method as mentioned above.

Some embodiments of the invention relate to a device for handling a service request within a local area network, the device being arranged for communicatively coupling to: an interface device providing a communication interface between a local area network and a wide area network; and a networked device for enabling installment of computer executable information within the local area network; and wherein the device is arranged for performing the method as mentioned above.

Some embodiments of the invention relate to a system for handling a service request, the system comprising: an interface device for providing a communication interface between a local area network and a wide area network; a networked device for enabling installment of computer executable information within the local area network; and a service request handling device as mentioned above.

Finally, some embodiments of the invention relate to a network architecture for handling a service request, the network architecture comprising: a local area network comprising at least one user device; a wide area network comprising a service locator system for locating a service location, and a service repository for storing computer executable information for performing a service; and a service request handling system as mentioned above.

It will be evident that the presently invented principle may be put into practice in various ways.

BRIEF DESCRIPTION OF DRAWINGS

Embodiments will now be described, by way of example only, with reference to the accompanying schematic drawings in which.

DETAILED DESCRIPTION OF EMBODIMENTS

The following is a description of various embodiments of the invention, given by way of example only and with reference to the drawings.

Figure 1:
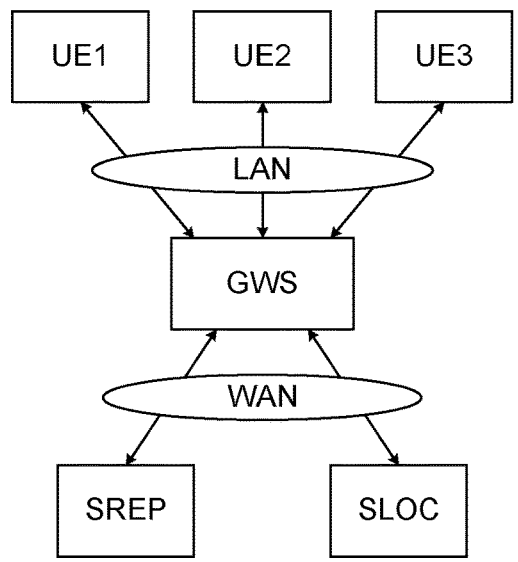
FIG. 1 schematically shows a network architecture for handling a service request in accordance with an embodiment of the invention.

FIG. 1 schematically shows a network architecture for service provisioning in accordance with an embodiment of the invention. The architecture relates to a network arrangement comprising a local area network (LAN) coupled to a wide area network (WAN) through a gateway system GWS. The LAN may be any private network, including but not limited to a home network, an office network, a car network, a personal area network and a network located at a specific geographic location. The local area network LAN may also be a logical network which is distributed over a number of geographic locations. The wide area network WAN provides connectivity to a plurality of interfacing devices in a wide area. For example, the wide area network may be or include the global network arrangement known as the Internet. The gateway system GWS may include an interface device, such as a modem or a router. Examples of modems include but are not limited to an Asymmetric Digital Subscriber Line (ADSL) modem, a Very high bit rate Digital Subscriber Line (VDSL) modem, a cable modem e.g. a DOCSIS modem, and a fiber modem. An example of a router is a a Wireless Fidelity (WiFi) router or an IP router.

The LAN is arranged to communicatively couple multiple devices or user equipment denoted as UE1, UE2 and UE3 with the gateway system GWS. Examples of devices include, but are not limited to Voice-over-Internet Protocol (VoIP) gateways, IP phones, PCs, laptops, webpads or other computing pad devices, smartphones, network area storage devices, IP video streaming devices, and television set top boxes. Furthermore, personal area network devices for heating, ventilation, air conditioning, lighting, audio, video and security can be considered as a type of user equipment.

The network architecture further comprises a service repository SREP and a service locator SLOC. The service repository SREP and the service locator SLOC connect to the gateway system GWS over the wide area network WAN. The GWS is aware of the presence and location of the SLOC, but may be unaware of the presence and location of the SREP. For simplicity only one SREP and only one SLOC are depicted. As will be understood by persons skilled in the art a network architecture may comprise multiple service repositories and service locators. Furthermore, a service repository and/or service locator may be hosted in the LAN as well.

The service repository SREP comprises a storage unit for storing services. A service may be defined as any kind of computer executable code that can add functionality to an electronic device. Examples of kinds of computer executable code include, but are not limited to a complete software package, a software package update, software configuration; and an amount of data used by a software package. The storage unit may comprise one or more databases. Throughout this application the expression "database" refers to any system containing entries and references thereof.

The service locator SLOC usually takes the form of a location service within a network, where the location service may be executed by multiple elements that cooperate together. Cooperation may be hierarchical, e.g. similar to the Domain Naming Systems (DNS). However, other ways of cooperation are also possible. For example, the SLOC may use Distributed Hash Tables (DHT) or it may use a peer-to-peer network.

Figure 2A:
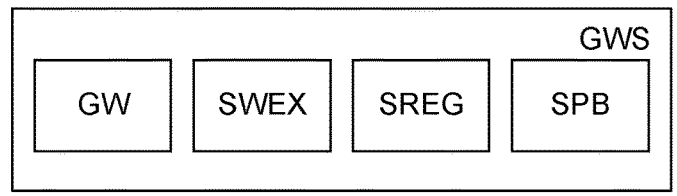
FIGS. 2a, 2b, 2c schematically show two possible gateway system architectures for use in the network architecture of FIG. 1.
Figure 2B:
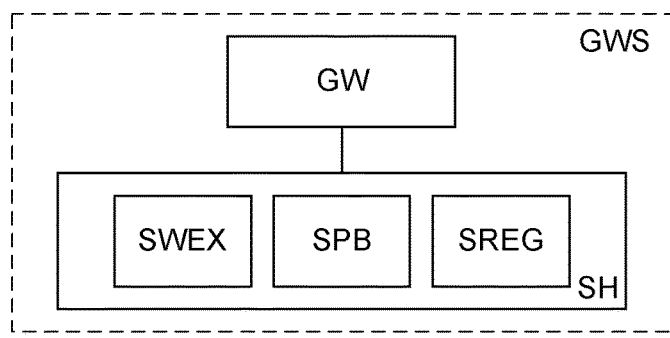
Figure 2C:
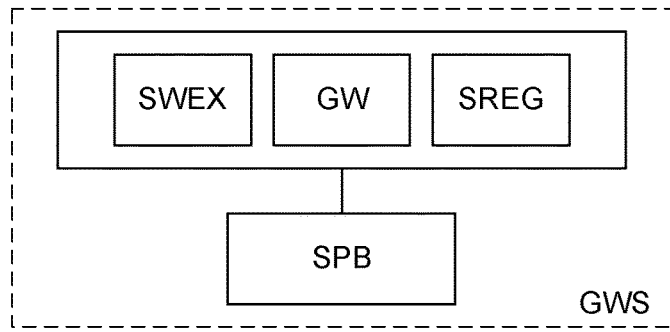

FIGS. 2a, 2b, 2c schematically shows a sub-network architecture for use in the network architecture of FIG. 1. The sub-network architecture includes an interface device GW, for example a modem or a router, and is further referred to as gateway system GWS. In addition, the gateway system GWS comprises a service provisioning broker SPB, and a software execution environment SWEX. As shown in the FIGS. 2a, 2b, the gateway system GWS may further include a service registry SREG.

The service provisioning broker SPB is arranged to handle a service request originating from user equipment within a local area network. The SPB is a logical component which may be co-located on the same physical device as the GW as schematically shown in FIG. 2a. Further details regarding the use of the service provisioning broker SPB will be discussed with reference to the signal flows schematically shown in FIGS. 3a, 3b.

The software execution environment SWEX can be used to install computer executable information, further referred to as software, for performing a service. The SWEX may be any platform upon which a software module may be dynamically, e.g. "on the fly" installed and which can run the software, such as e.g. an OSGi based platform, a linux platform or a Windows platform. Any platform upon which software can be dynamically processed, where the expression "processed" refers to at least one of installed, configured, adapted, changed or managed, can be seen as a SWEX in the context of this invention. The information available within the SWEX can be used by user equipment to perform a desired service within the local area network without limitations in the form of firewalls, with direct access to the local network, and the like. Furthermore, in a preferred embodiment, the information installed in the SWEX can be retrieved directly after installment without the need of rebooting the gateway system to enable execution of the corresponding service within the local area network. Note that there may be more than one SWEX within a local area network.

The service registry SREG can be used to register services that are available within the local area network. The SREG may register all services, or a portion of the services, for example in the case where more registered devices are present within the local area network. The use of a list of available services within the local area network stored at a central location within the gateway system GWS allows for an easy check by the gateway system GWS whether a requested service is already available within the local area network LAN or not.

In the gateway system GWS of FIG. 2a all components described above are located within a single module. Having all functionality within a single module reduces the complexity of the network. In addition, energy consumption throughout the network may be reduced.

In FIG. 2b the interface device GW forms a separate module that is communicatively coupled to the other components, which in this case are grouped in a single module. In FIG. 2c the interface device GW is part of a more complex module further including a software executable environment SWEX and a service registry SREG. This module is communicatively coupled to an SPB in a separate module. The configuration of FIGS. 2b, 2c may be useful in the case where a local area network already has a gateway system in place. Expanding the functionality of the gateway system may then be established by mere addition of desired functional modules. In the case of a basic gateway system GWS which includes an interface device GW with limited capabilities, e.g. mere routing capabilities, the addition may include a relatively complex module SH as shown in FIG. 2b. However, if the gateway system GWS already includes more functionality as shown in FIG. 2c, expanding the capability of the gateway system may be established by adding a communicative coupling to a module comprising an STB as shown in FIG. 2c.

Further details with respect to the functionality of the service provisioning broker will be discussed with reference to FIG. 3a, 3b, Note that besides the options schematically shown in FIGS. 2a-2c, gate way systems with a different number of modules may be possible as well. For example, a network architecture may comprise a separate module for the interface device GW, a separate module for the service provisioning broker SPB and a separate module for the software execution environment SWEX. All modules can communicate with each other across the local area network LAN. The optional service registry SREG may be located in yet another module. Furthermore, the functionality may be shared by multiple modules. For example, the SWEX may be spread over multiple modules that are communicatively coupled.

Figure 3A:
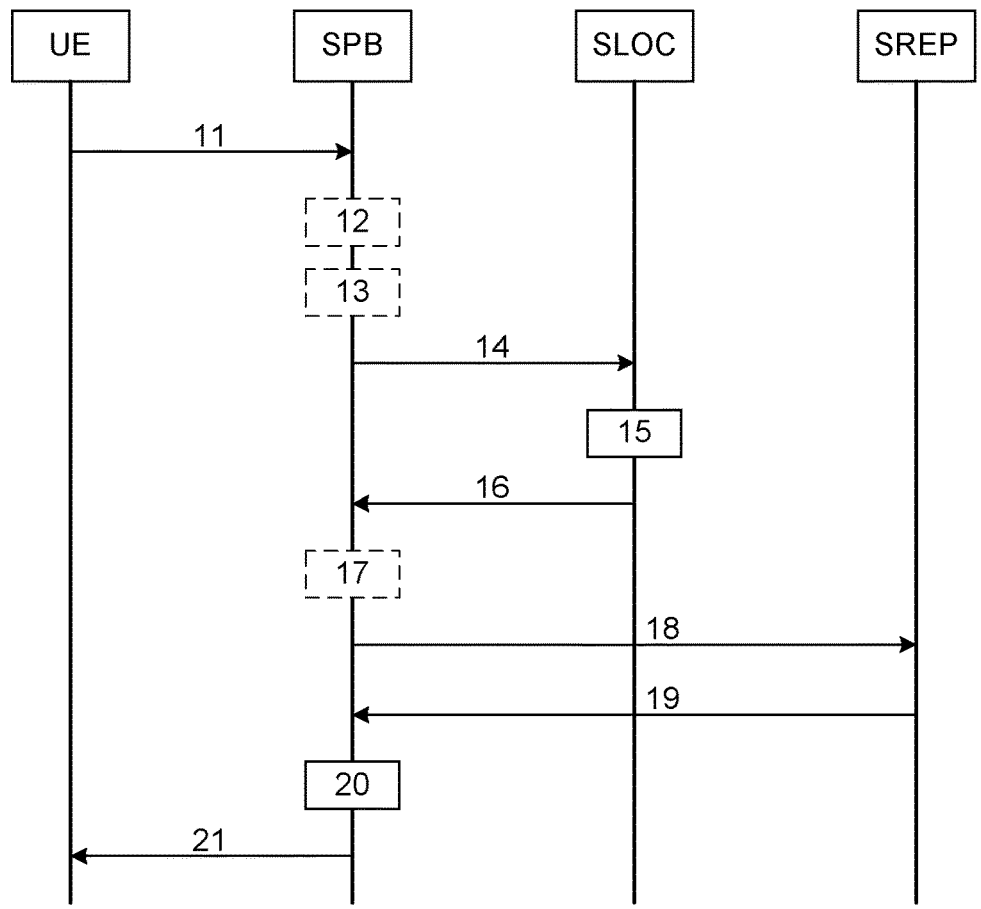
FIG. 3a schematically shows a signal flow of a method for handling an service request in the architecture of FIG. 1 in accordance with an embodiment of the invention.

FIG. 3a schematically shows an exemplary signal flow of a method of handling a service request in the architecture explained with reference to FIGS. 1, 2a and 2b. In the signal flow, entities are represented in a general sense, i.e. the user equipment requesting a service to be offered by a networked device in the LAN is referred to as UE. That is, user equipment UE may correspond with any one of devices UE1, UE2 and UE3 in the architecture of FIG. 1. Additionally, in this signal flow the assumption is made that the requested service is stored in the service repository SREP and that the location of the service is stored at a location known to the service locator SLOC.

First in action 11, the user equipment UE sends a service request to the service provisioning broker SPB to obtain computer executable information, further referred to as software, for performing a service. The service request may be sent using multicast or unicast messaging. The service request may be sent directly by the UE upon realization that a service is needed. Alternatively, the service request may be sent after an unsuccessful service discovery within the local area network.

The service request comprises information regarding service parameters. The service parameters included in the service request include all service features, service requirements and service options that are at least required by the UE to be supported by the requested service.

For example, in case of a printer service, such information may not only include service type information, i.e. printer, but also other parameters such as desired paper size, desired paper color, and desired way of binding the papers after printing, for example wire stitching.

Another example would be a service request that is service provider specific. For instance, the user device may be an Apple iPhone. The iPhone may then request a service from the Apple iTunes store. In such case, the service request should indicate that the service should be downloadable from a location certified by the service provider responsible for the requested service, i.e. Apple.

Optionally, the SPB checks in action 12 whether the service is available within the local area network. In particular if checking does not take a lot of time and effort, checking the service availability within the local area network improves the service request performance as at least actions 13 through 20 as discussed below can be omitted. If a service is already available within the local area network, service delivery can be performed in a way known in the art, for example by using standard UPnP working.

After receiving the service request, or if checking is performed, after determining that the requested service is unavailable within the local area network, the SPB forwards the service request to the service locator SLOC in action 14, or performs a localization request based on the information contained in the service request. Note that it is not necessarily needed that the SPB, or any other component in the GWS, has any knowledge of what is actually asked for in the service request. The SPB may merely know that a service is requested.

Before the forwarding in action 14, the SPB may add additional information to the service request in action 13. The additional information relates to the capabilities of the gateway system GWS upon which the software will be installed, or the capabilities of another device if the software will be installed elsewhere. Also, other capabilities such as e.g. the capabilities of the LAN network (speed, delays, technology used) or other available devices and services (e.g. the availability of Network Attached Storage, the availability of certain software libraries, etc.) may be added. The addition of this information may help the service locator SLOC to improve its search as software downloads incompatible with the capabilities of the GWS are discarded at an early stage.

On the basis of the information regarding the service type and the one or more requirements, the SLOC then localizes, in other words identifies, a location where the requested service is available for download within the public network, e.g. wide area network WAN, in action 15. In this example, the SLOC finds that the requested service-related software can be found, among others, in the service repository SREP.

The expression "download location" is not meant to merely refer to a specific address, such as an IP-address, at which software related to the service can be downloaded. The expression "download location" also relates to other information that is sufficient to deduce a specific download address. In some embodiments the download location is given by way of information referring to a specific address, for example in the form of a Uniform Resource Locator (URL) from which an IP-address can be resolved by means of DNS-resolution. Another 'download location' could be a .torrent file, an e2dk-link or specific URLs such as a Google Docs sharing link.

After finding the download location, this location is transferred from the SLOC to the SPB in action 16. Note that it is evenly well possible that the SLOC during action 15 identifies multiple download locations. In such case, all these download locations may be transferred to the SPB.

In action 18 the SPB sends a download request message to the identified download location, i.e. service repository SREP. In case multiple download locations are received, the SPB selects the download location in action 17. Selection of a suitable download location by the SPB results in a fast selection time. Furthermore, the selection may be based on gateway system preferences and/or knowledge of the wide area network. For example, the selection may be based on the expected quality of connection between the download location and the gateway system over the wide area network. In yet another example, the selection may be based on preferred download locations, for example from a preferred service provider.

In response to this download request message the SREP provides access to the software related to the service. The SPB can now retrieve the service-related software in action 19. In many embodiments, retrieving the software includes a software download action. The download action may include but is not limited to software transfer by using FTP (File Transfer Protocol), HTTP (HyperText Transfer Protocol), SMTP (Simple Mail Transfer Protocol), and TR-069. In some other embodiments software retrieval may be done by using an off-line method, such as transferring the software while being stored on a physical computer-readable medium such as a suitable disc or a USB-stick (Universal Serial Bus).

The downloaded software is installed on the networked device in action 20. This can be done within the gateway system GWS or at another location within the local area network accessible to the GWS. Installing of the software within the GWS has the advantage that in case a checking procedure as presented in action 12 is used, such checking can be performed within a short period of time.

In particular, within the GWS the service-related software may be installed on a software execution device SWEX. Installing the software on the SWEX has the advantage that no reboots are needed to enable execution of the service within the local area network after installment. Service information such as service type and requirement information related to the service for which software is downloaded may be stored in the service registry. Such registration increases the knowledge of the available services within the local area network.

After installment of the service the SPB informs the user equipment UE that the service is available within the local area network in action 21. The user equipment UE can now use this service just like any other available service within the local area network, e.g. comparable to UPnP service usage.

A method for handling a service request as laid out in FIG. 3a allows for dynamically installing software within a local area network upon request by a device. The availability of the software within the local area network improves the reliability of user devices within the local area network. Services that normally run remotely may now be used locally, which avoids any risks related to lack of transparency, for example due to different ways of addressing in the wide area network and the local area network, or to the presence of free communication barriers, such as fire walls. Furthermore, the use of a method as described with reference to FIG. 3a avoids the need of advance configuration of any and all available services within a gateway system, which is very difficult to achieve in view of new services that become available everyday and due to a lack of physical resources like e.g. memory to install any and all available services.

Optionally, the gateway system GWS sends a provisional response message to the requesting user device UE in response to the service request. The provisional response message may include information regarding the expected time it will take to obtain more certainty with respect to the availability of the requested service and/or the time needed to make the service available (after download). In some embodiments, the provisional response may include a preliminary announcement with respect to the availability of the service. The use of a provisional response message reduces the chance of timeouts in the network, as the knowledge of the user device as to what to expect improves. If no provisional response is sent, the device UE may believe the service is unavailable and terminate its service request, even though the service can be made available albeit not immediately. In case of a provisional response, the device UE may extend its waiting time before terminating the service request, which enables the use of the service if it is provided somewhat later than initially desired.

Figure 3B:
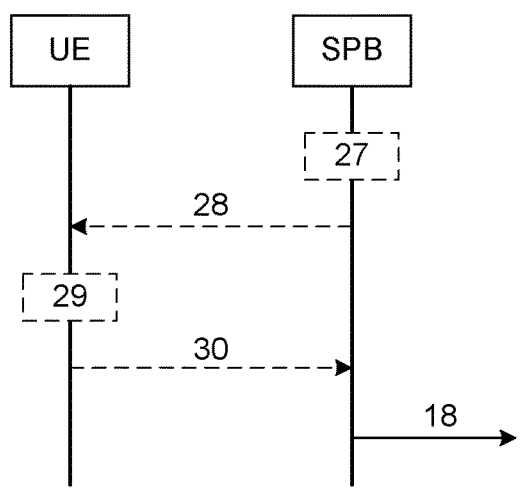
FIG. 3b schematically shows a portion of a signal flow of a method for handling a service request in the architecture of FIG. 1 in accordance with another embodiment of the invention.

FIG. 3b schematically shows a portion of an exemplary signal flow of another embodiment of a method of handling a service request in the architecture explained with reference to FIGS. 1, 2a and 2b. Up to action 16 the method according to this embodiment is similar to the method described with reference to FIG. 3a. In this embodiment, multiple download locations are found in action 15 and transferred to the SPB in action 16, preferably including details on the available services. However, instead of a selecting action 17, the SPB now merely recognizes that more than one download location has been received in action 27.

Upon recognition of multiple download locations the SPB sends a selection request message to the UE in action 28. The UE then selects the preferred download location in action 29, for example based on additional criteria not present in the service request. After selection the UE sends a selection response message to the SPB containing the selected download location in action 30. Upon receipt of the selection response message the SPB proceeds by executing action 18 and further as explained with reference to FIG. 3*a*.

Selection of a download location by the UE has the advantage that the optimal service can be selected. Where the service request may contain the minimal requirements, the selection of the download location may be based on additional criteria. For example, if a printer service has been requested with the criterion that the printer should be capable of handling a paper format of A3, download locations corresponding to multiple printers may be found. The method according to the signal flow shown in FIG. 3*b* enables the UE to select a printer that can handle preferred options, for example a printer that can print in full color. If only one of the printers capable of printing A3-format paper can print in full color, the UE can select this specific printer.

The service provisioning broker may be implemented as a computer system comprising a processor with peripherals. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor.

Embodiments of the method may be stored on a computer readable medium, for example a DVD or USB-stick, for performing, when executed by the processor, embodiments of a method for handling a service request within a local area network. The stored data may take the form of a computer program, which computer program is programmed to implement an embodiment of the method when executed by the computer system after loading the computer program from the computer readable medium into the computer system.

It will be apparent to the person skilled in the art that other alternative and equivalent embodiments of the invention can be conceived and reduced to practice without departing from the spirit of the invention, the scope of the invention being limited only by the appended claims.

ABBREVIATIONS

ADSL: Asymmetric Digital Subscriber Line
DHT: Distributed Hash Table
DNS: Domain Naming System
DOCSIS: Data Over Cable Service Interface Specification
DVD: Digital Video Disc
FTP: File Transfer Protocol
HTTP: HyperText Transfer Protocol
I/O: Input/Output
IP: Internet Protocol
LAN: Local Area Network
OSGi: Open Service Gateway initiative
SMTP: Simple Mail Transfer Protocol
UE: User Equipment
UPnP: Universal Plug and Play
URL: Uniform Resource Locator
USB: Universal Serial Bus
VDSL: Very high bit rate Digital Subscriber Line
VoIP: Voice over Internet Protocol
WAN: Wide Area Network
WiFi: Wireless Fidelity
XML: Extensible Markup Language

The invention claimed is:

1. A method for handling a service request within a local area network, the method comprising:
   receiving, at a service provisioning broker on a gateway system coupling the local area network to a public network, the service request from a user device on the local area network requesting a service to be offered by a networked device of the gateway system in the local area network, the service request comprising information regarding one or more requirements needed by the user device to perform the service;
   after receiving the service request, the service provisioning broker modifying the service request by adding additional information relating to capabilities of the gateway system upon which computer executable information will be installed for offering the service by the networked device to the user device;
   the service provisioning broker forwarding the modified service request to a service locator system within the public network to obtain information indicative of one or more download locations of the computer executable information determined based on (i) the information regarding one or more requirements needed by the user device to perform the service and (ii) the additional information;
   retrieving, by the service provisioning broker from the service locator system, the information indicative of the one or more download locations suitable for downloading the service;
   selecting a download location from the one or more download locations;
   retrieving, by the service provisioning broker, the computer executable information from the selected download location for performing the service and arranging installment of the computer executable information on the networked device so as to offer the service by the networked device in the local area network to the user device requesting the service; and
   after the installment, sending a message to the user device regarding the availability of the service within the local area network.

2. The method of claim 1 further comprising, after receiving the service request, checking if the service is available within the local area network, wherein the, forward the modified service request, the retrieving the one or more download locations, the selecting the download location, the retrieving the computer executable information and the arranging installment of the computer executable information are executed when the service is unavailable.

3. The method of claim 2, wherein the checking comprises forwarding the service request to devices within the local area network, and waiting, for a predetermined period of time, for a response message from one of the devices confirming that the service is available, and wherein the service is considered to be unavailable if no confirmation response message has been received within the predetermined period of time.

4. The method of claim 2, wherein the local area network comprises a service registry comprising a list of services available within the local area network, and the checking comprises consulting the service registry.

5. The method of claim 1, wherein the retrieving the one or more download locations comprises:
receiving multiple locations suitable for downloading the service from the service locator system; and
selecting the download location.

6. The method of claim 5, wherein the selecting the download location is based on predetermined criteria.

7. The method of claim 6, wherein the selecting the download location comprises:
forwarding to the user device the multiple locations suitable for downloading the requested service; and
receiving a selected download location from the user device in response.

8. The method of claim 5, wherein selecting the download location comprises the gateway system selecting the download location based on gateway system preferences and knowledge of the public network.

9. A non-transitory computer readable medium having instructions stored thereon that, when executed by one or more processors of a service provisioning broker on a gateway system coupling a local area network to a public network, cause the service provisioning broker to carry out operations including:
receiving a service request from a user device on the local area network requesting a service to be offered by a networked device of the gateway system in the local area network, the service request comprising information regarding one or more requirements needed by the user device to perform the service;
after receiving the service request, modifying the service request by adding additional information relating to capabilities of the gateway system upon which computer executable information will be installed for offering the service by the networked device to the user device;
forwarding the modified service request to a service locator system within the public network to obtain information indicative of one or more download locations of the computer executable information determined based on (i) the information regarding one or more requirements needed by the user device to perform the service and (ii) the additional information,
retrieving from the service locator system the information indicative of the one or more download locations suitable for downloading the service;
selecting a download location from the one or more download locations;
retrieving the computer executable information from the selected download location for performing the service and arranging installment of the computer executable information on the networked device so as to offer the service by the networked device in the local area network to the user device requesting the service; and
after the installment, sending a message to the user device regarding the availability of the service within the local area network.

10. The method of claim 1, further comprising:
in response to receiving the service request, sending a provisional response to the user device, wherein the provisional response comprises information regarding a time for making the service available in the local area network.

11. The method of claim 10, further comprising:
based on the provisional response, the user device extending a waiting time before the user device would terminate the service request.

12. The method of claim 1, further comprising:
in response to receiving the service request, sending a provisional response to the user device, wherein the provisional response comprises information regarding an expected time to obtain more certainty with respect to availability of the service in the local area network.

13. The method of claim 1, wherein the networked device in the local area network is a software execution device.

14. The method of claim 1, further comprising:
the user device sending the service request in response to a realization by the user device that the service is needed.

15. A gateway system for handling a service request within a local area network, the gateway system configured to couple the local area network to a public network and comprising:
an interface device providing a communication interface between the local area network and the public network;
a networked device for enabling installment of computer executable information within the local area network;
a processor; and
data storage comprising instructions executable by the processor to carry out operations of the gateway system for handling the service request within the local area network, the operations including:
receiving, at a service provisioning broker on the gateway system, the service request from a user device on the local area network requesting a service to be offered by a networked device of the gateway system in the local area network, the service request comprising information regarding one or more requirements needed by the user device to perform a service;
after receiving the service request, the service provisioning broker modifying the service request by adding additional information relating to capabilities of the gateway system upon which computer executable information will be installed for offering the service by the networked device to the user device;
the service provisioning broker forwarding the modified service request to a service locator system within the public network to obtain information indicative of one or more download locations of the computer executable information determined based on (i) the information regarding one or more requirements needed by the user device to perform the service and (ii) the additional information;
retrieving, by the service provisioning broker from the service locator system, the information indicative of the one or more download locations suitable for downloading the service;
selecting a download location from the one or more download locations;

retrieving, by the service provisioning broker, the computer executable information from the selected download location for performing the service and arranging installment of the computer executable information on the networked device so as to offer the service by the networked device in the local area network to the user device requesting the service; and after the installment, sending a message to the user device regarding the availability of the service within the local area network.

16. The gateway system of claim 15, further comprising a service registry for registering available services within the local area network.

17. A network system for handling a service request, the network system comprising:

a local area network comprising at least one user device;

a wide area network comprising a service locator system for locating a service location, and a service repository for storing computer executable information for performing a service; and a gateway system comprising a service provisioning broker configured to carry out operations including:

receiving a service request from a user device on the local area network requesting a service to be offered by a networked device of the gateway system in the local area network, the service request comprising information regarding one or more requirements needed by the user device to perform the service;

after receiving the service request, modifying the service request by adding additional information relating to capabilities of the gateway system upon which computer executable information will be installed for offering the service by the networked device to the user device;

forwarding the modified service request to the service locator system to obtain information indicative of one or more download locations of the computer executable information determined based on (i) the information regarding one or more requirements needed by the user device to perform the service and (ii) the additional information;

retrieving from the service locator system the information indicative of the one or more download locations suitable for downloading the service;

selecting a download location from the one or more download locations;

retrieving the computer executable information from the selected download location for performing the service and arranging installment of the computer executable information on the networked device so as to offer the service by the networked device in the local area network to the user device requesting the service, and after the installment, sending a message to the user device regarding the availability of the service within the local area network.

* * * * *